US006685150B2

(12) United States Patent
Anderson

(10) Patent No.: US 6,685,150 B2
(45) Date of Patent: Feb. 3, 2004

(54) CONDUCTIVE SPEAKER MOUNTING SYSTEM

(76) Inventor: Ross Anderson, 1185 Morena Blvd., San Diego, CA (US) 92110

( * ) Notice: Subject to any disclaimer, the term of this patent is extended or adjusted under 35 U.S.C. 154(b) by 212 days.

(21) Appl. No.: 09/920,685

(22) Filed: Aug. 1, 2001

(65) Prior Publication Data

US 2003/0026445 A1 Feb. 6, 2003

(51) Int. Cl.[7] .............................................. F16M 11/00

(52) U.S. Cl. ................. 248/201; 248/225.21; 439/530; 439/576; 439/929

(58) Field of Search ....................... 248/225.21, 220.22, 248/675, 475.1, 201; 439/529, 530, 576, 929; 211/94.01, 106.01; 312/245, 246

(56) References Cited

U.S. PATENT DOCUMENTS

| | | | | | |
|---|---|---|---|---|---|
| 311,616 | A | * | 2/1885 | Smith | 439/929 |
| 1,497,420 | A | * | 6/1924 | White | 439/929 |
| 1,805,988 | A | * | 5/1931 | Kraft | 439/929 |
| 2,766,434 | A | * | 10/1956 | Gear | 439/929 |
| 2,825,799 | A | * | 3/1958 | Julien | 439/929 |
| 2,891,757 | A | * | 6/1959 | Lang | 248/201 |
| 3,117,353 | A | * | 1/1964 | Edwards | 248/225.2 |
| 3,622,116 | A | * | 11/1971 | Fellows | 248/225.2 |
| 3,881,676 | A | * | 5/1975 | Reinwall | 248/224.4 |
| 4,083,525 | A | * | 4/1978 | Rath | 248/224.4 |
| 4,457,436 | A | * | 7/1984 | Kelley | 248/225.2 |
| 4,661,885 | A | * | 4/1987 | Brenner et al. | 248/224.4 |
| 5,048,782 | A | * | 9/1991 | Cauffman et al. | 248/225.2 |

* cited by examiner

*Primary Examiner*—Korie Chan
(74) *Attorney, Agent, or Firm*—Freling E. Baker; Brown, Martin, Haller & McClain LLP

(57) ABSTRACT

A speaker mounting system includes a first bracket member for attachment to a support structure, a first pair of conductor contacts on the first bracket member for connection to a pair of speaker conductors, a second bracket member for attachment to a speaker and for detachably attaching to the first bracket member, and a second pair of conductor contacts on the second member for connection to the first pair of conductor contacts on the first bracket member and to pair of speaker conductors on the speaker.

8 Claims, 5 Drawing Sheets

CONDUCTIVE SPEAKER MOUNTING SYSTEM

BACKGROUND OF THE INVENTION

1. Field of the Invention

The present invention relates generally to mounting brackets and pertains particularly to speaker mounting brackets having detachable conductive connections.

2. Description of the Related Art

It is known that the positioning, arrangement and orientation of speakers in commercial and residential settings can affect the quality of sound from a sound system. Many approaches have been taken to the positioning of speakers in a room in order to optimize the quality of sound from a system. One important aspect of such arrangements is the mounting of the speakers on the walls at or above head level. In order to make such mountings as aesthetically pleasing as possible, the speaker wires must be hidden within the walls and emerge at the point of mounting. The mounting of speakers at such levels or heights require two people. One person must hold the speaker adjacent the mounting bracket while the other person connects the speaker wires to the speaker. Such mounting arrangements are difficult, if not impossible, for one person to accomplish.

One approach of the prior art that would appear to solve some aspects of the above described problem is described in U.S. Pat. No. 4,953,223. This patent discloses a standard or pole having conductor lines with one or more speakers mounted on and vertically positioned on the pole. This permits vertical positioning on a pole by one person but, does not solve the problem of wall mounting. Another system disclosed in U.S. Pat. No. 4,953,223 employs the use of a ceiling mounted track system for mounting both lights and speakers. However, in this system the positioning of the speakers limited to the ceiling.

In view of the foregoing, it is clear there is a need for a mounting system that enables a single individual to mount speakers on walls.

SUMMARY OF THE INVENTION

In accordance with a primary aspect of the invention, a speaker mounting system comprises a first bracket member for attachment to a support structure, a first pair of conductor contacts on said first bracket member for connection to a pair of speaker conductors, a second bracket member for attachment to a speaker and for detachably attaching to said first bracket member, and a second pair of conductor contacts on said second member for connection to said first pair of conductor contacts on said first bracket member and to pair of speaker conductors on said speaker.

BRIEF DESCRIPTION OF THE DRAWINGS

The above and other object and advantages of the present invention will become apparent from the following description when read in conjunction with the accompanying drawings wherein.

DETAILED DESCRIPTION OF THE PREFERRED EMBODIMENT

The problems of the prior art are addressed and solved by the present invention which comprises generally a novel speaker mounting system which comprises a first bracket member for attachment to a support structure, a first pair of conductor contacts on said first bracket member for connection to a pair of speaker conductors, a second bracket member for attachment to a speaker and for detachably attaching to said first bracket member, and a second pair of conductor contacts on said second member for connection to said first pair of conductor contacts on said first bracket member and to pair of speaker conductors on said speaker.

Figure 1:
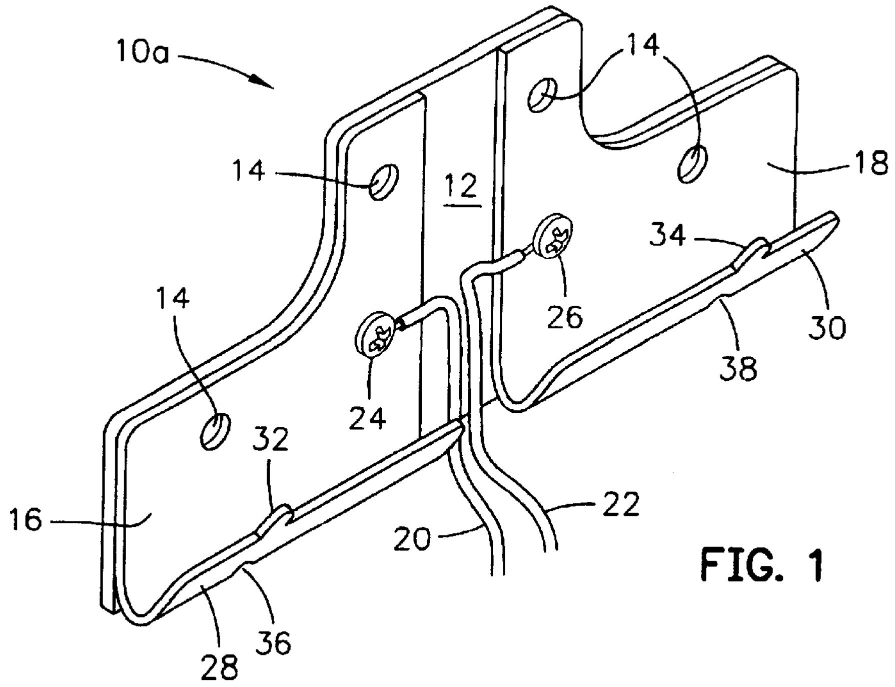
FIG. 1 is an isometric view of one component of one embodiment of the invention.
Figure 2:
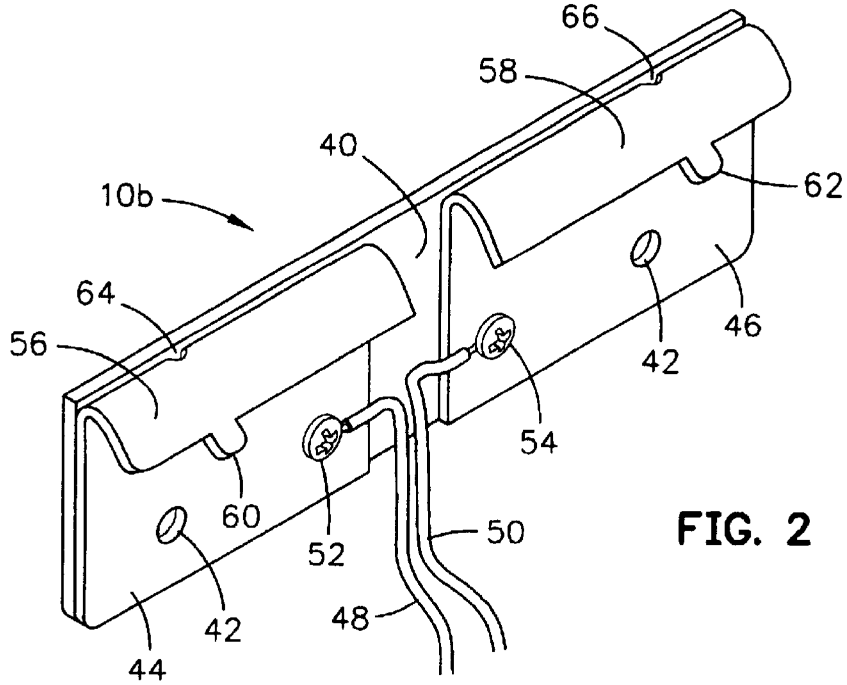
FIG. 2 is a view like FIG. 1 of a second component of the embodiment of FIG. 1.

Referring to FIGS. 1 and 2 of the drawing, a speaker mounting system, in accordance with one embodiment of the invention is illustrated and designated generally by the numeral 10*a* and 10*b*. The system comprises a first bracket member 10*a* that is adapted for mounting to a support structure such as a wall or the like. The first bracket member comprises a generally rectangular first mounting plate 12 preferably formed of, or at least covered by a non-conductive material. The bracket member has a back face adapted to engage a wall or other surface and be suitably attached to a wall or other support surface. It may be secured or attached by suitable means such as screws or nails through a plurality of holes 14. A pair of laterally spaced conductor members 16 and 18 are mounted on or form a front face of the bracket member. These conductor members are in the form of conductive plates adapted to be connected by speaker wires or conductors 20 and 22 to an amplifier. The speaker wires may be connected by screws, solder or other means 24 and 26 to the conductor plates and are adapted to be connected to an amplifier or other source of sound for the speaker.

The conductor members 16 and 18 are preferably made of a conductive material of sufficient strength and rigidity to also function as a support structure for a speaker. The conductor members are each shown to be in the form of a plate with each having a forward and slightly upwardly curved or extending lip or ledge 28 and 30. The forwardly extending lip of each of the conductor plates is shown to be formed along a lower portion thereof. Each of the forwardly extending lips includes contact points which engage like contact points on the second bracket on the speaker member as will be described below. Each point of contact includes at least one pin or projection 32 (34) on a forward edge of each lip. Each point of contact also includes at least one socket or receptacle 36 (38) at the juncture of each lip with each of the conductor plates for receiving projections on the other or second bracket member. These pin and socket contacts in the illustrated embodiment form both the structural and electrical connections simultaneously.

Referring to FIG. 2 of the drawing, a second component of the speaker mounting system, in accordance with one embodiment of the invention is illustrated and designated generally by the numeral 10*b*. This member combines with 10*a* to form the speaker mounting system. The second bracket member comprises a generally rectangular second mounting plate 40 preferably formed of, or at least covered by an insulating or non-conductive material. The bracket member has a back face adapted to engage an outer surface of a speaker enclosure and be suitably attached thereto. The members may be secured or attached to a speaker by suitable means such as screws or nails through a plurality of holes 42. A pair of laterally spaced conductor members 44 and 46 are mounted on or form a front face of the second bracket member. Speaker wires or conductors 48 and 50 may be connected by screws, solder or other means 52 and 54 to the conductor plates to connect the speaker to an amplifier or other source of sound.

The contact or conductor plate members 44 and 46 are preferably made of a conductive material of sufficient strength and rigidity to also function as a support structure for a speaker. The conductor plate members are each shown to be in the form of a plate with each having a forward and slightly downwardly curved or extending lip or ledge 56 and 58. The forwardly extending lip of each of the conductor plates is shown to be formed along an upper portion thereof. Each of the forwardly extending lips includes points of contact which engage corresponding points of contact or connection on the first bracket on the wall as will be described. Points of contact on the each lip of the second bracket member comprise at least one projection or pin 60 (62) on a forward edge of each lip. Each point of contact also includes at least one receptacle or socket 64 (66) at the juncture of each of the lip with the conductor plate for receiving projections on the other bracket member.

While the conductor plates and the pin and socket connectors are shown herein to be integral and form both structural and electrical connectors, it will be appreciated that they may be separate. Alternatives may include one set of pins and sockets that form the structural connection and a separate set of pins and sockets that form the electrical connection. Such arrangements would preferably be structured and arranged so that they connect simultaneously. The respective pins may be on the same or a different bracket member.

Figure 3:
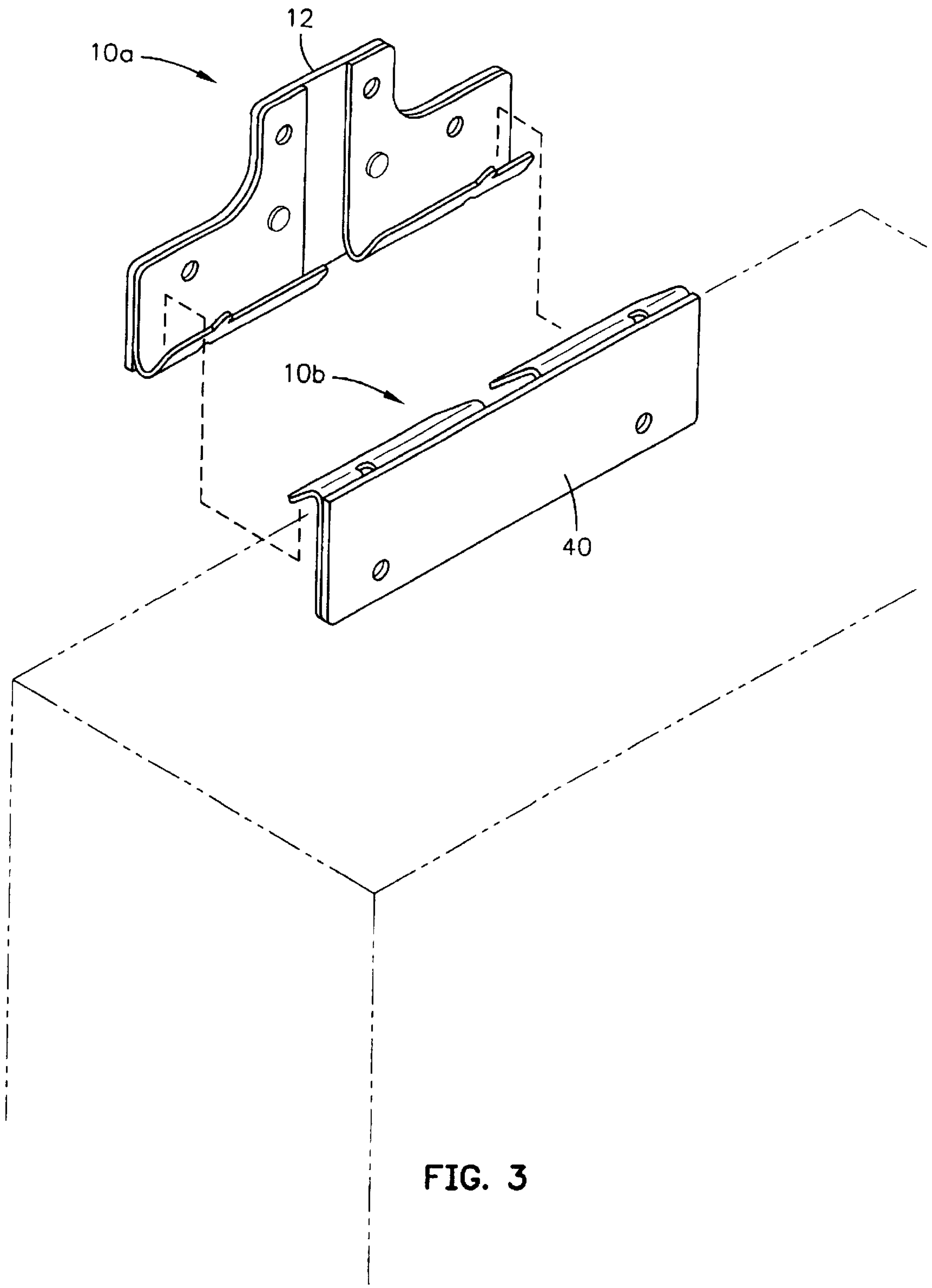
FIG. 3 is an isometric view of the embodiment of FIG. 1 showing assembly of the invention.

In operation, referring to FIG. 3, the first bracket member 10*a* is attached to a wall or other support surface at a selected height and speaker wires from an amplifier attached thereto. The second bracket member 10*b* is attached to a surface such as the back of a speaker and speaker or lead wires connected from the speaker to the conductor plates. The speaker is then lifted and placed so that the lip of the second bracket member 10*b* hooks over the lip of the first bracket member 10*a* and the pins and sockets engage. The speaker is thereby simultaneously mounted to the wall and connected to the amplifier.

Figure 4:
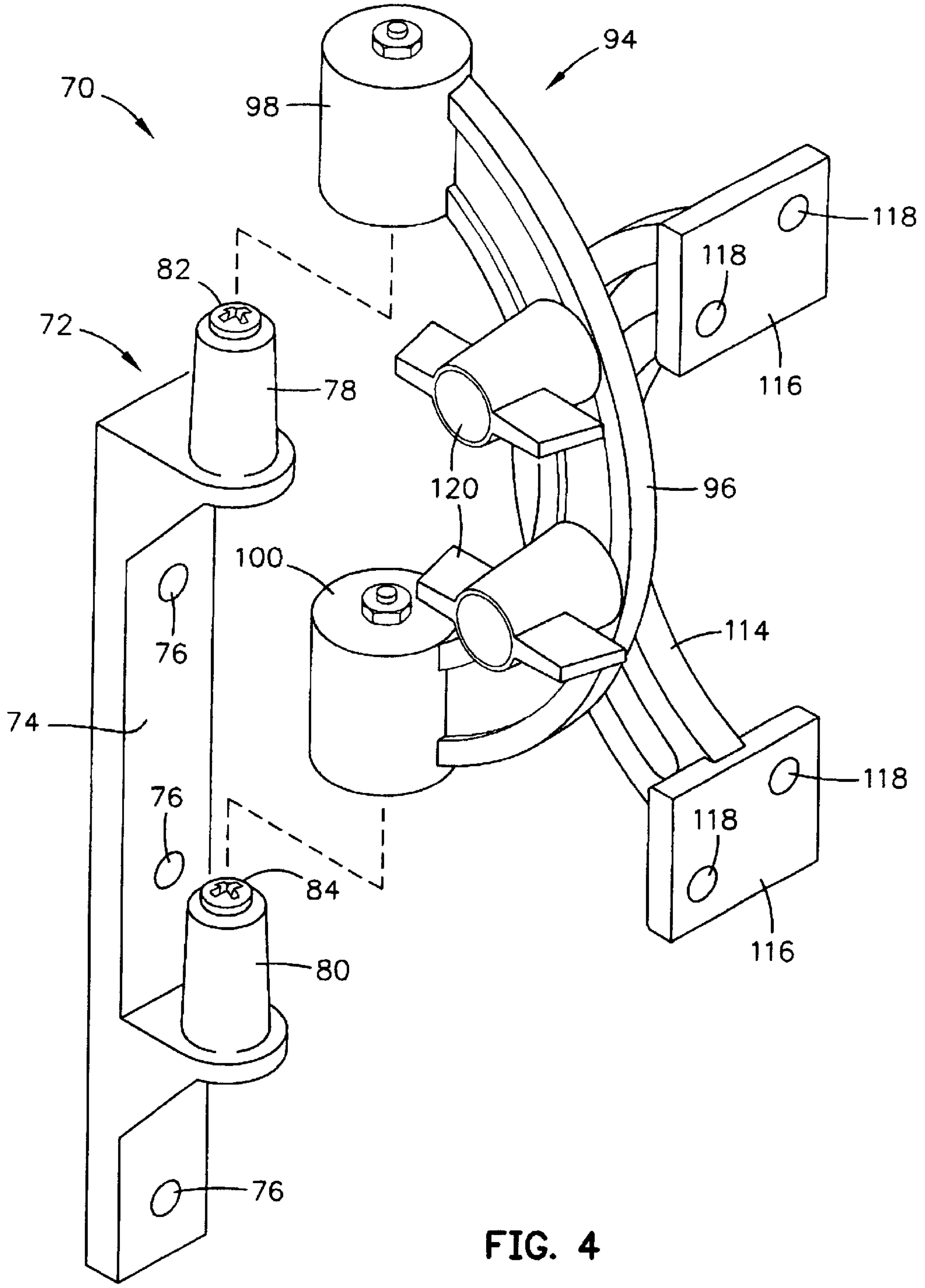
FIG. 4 is an isometric view of another embodiment of the invention.
Figure 5:
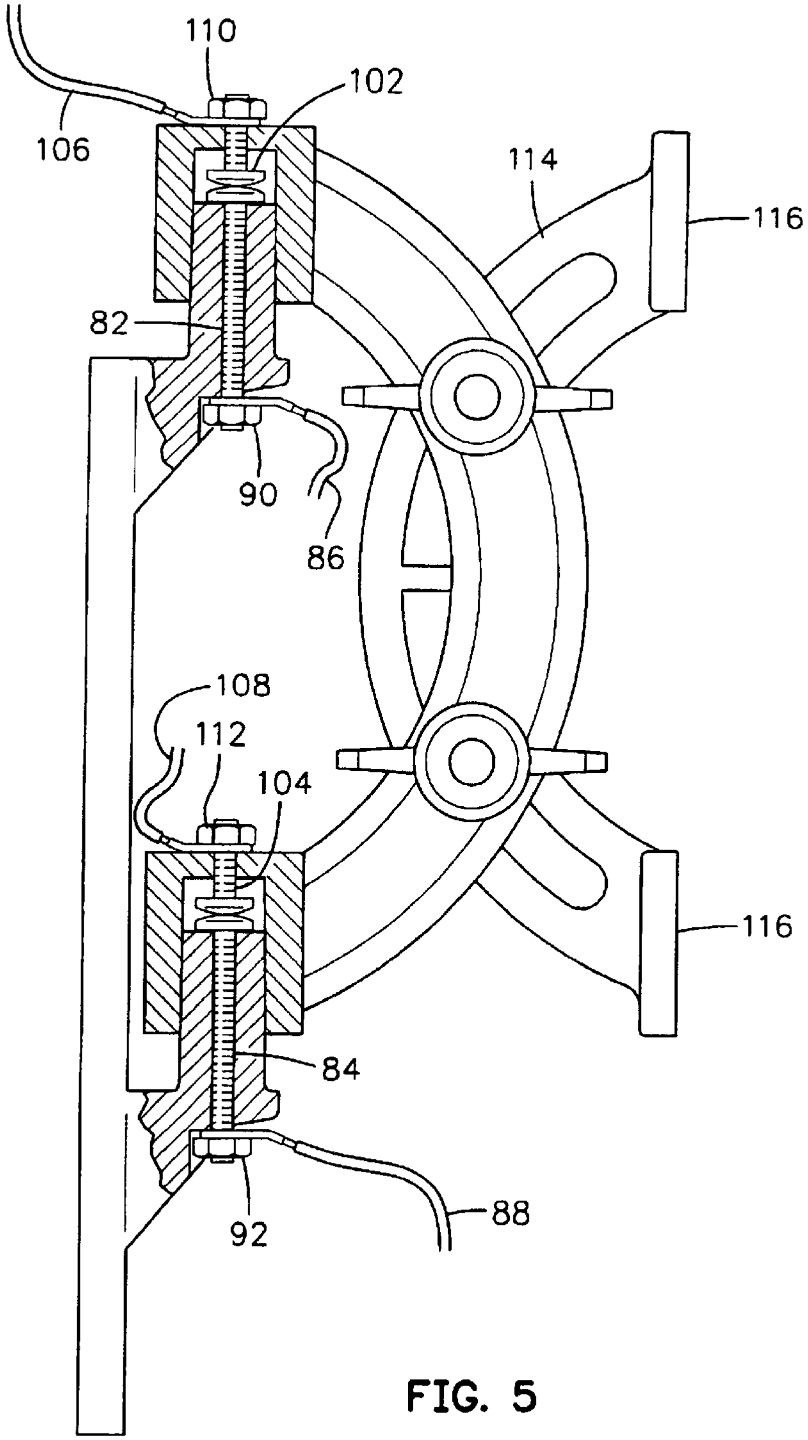
FIG. 5 is a view taken on line 5—5 of FIG. 4.
Figure 6:
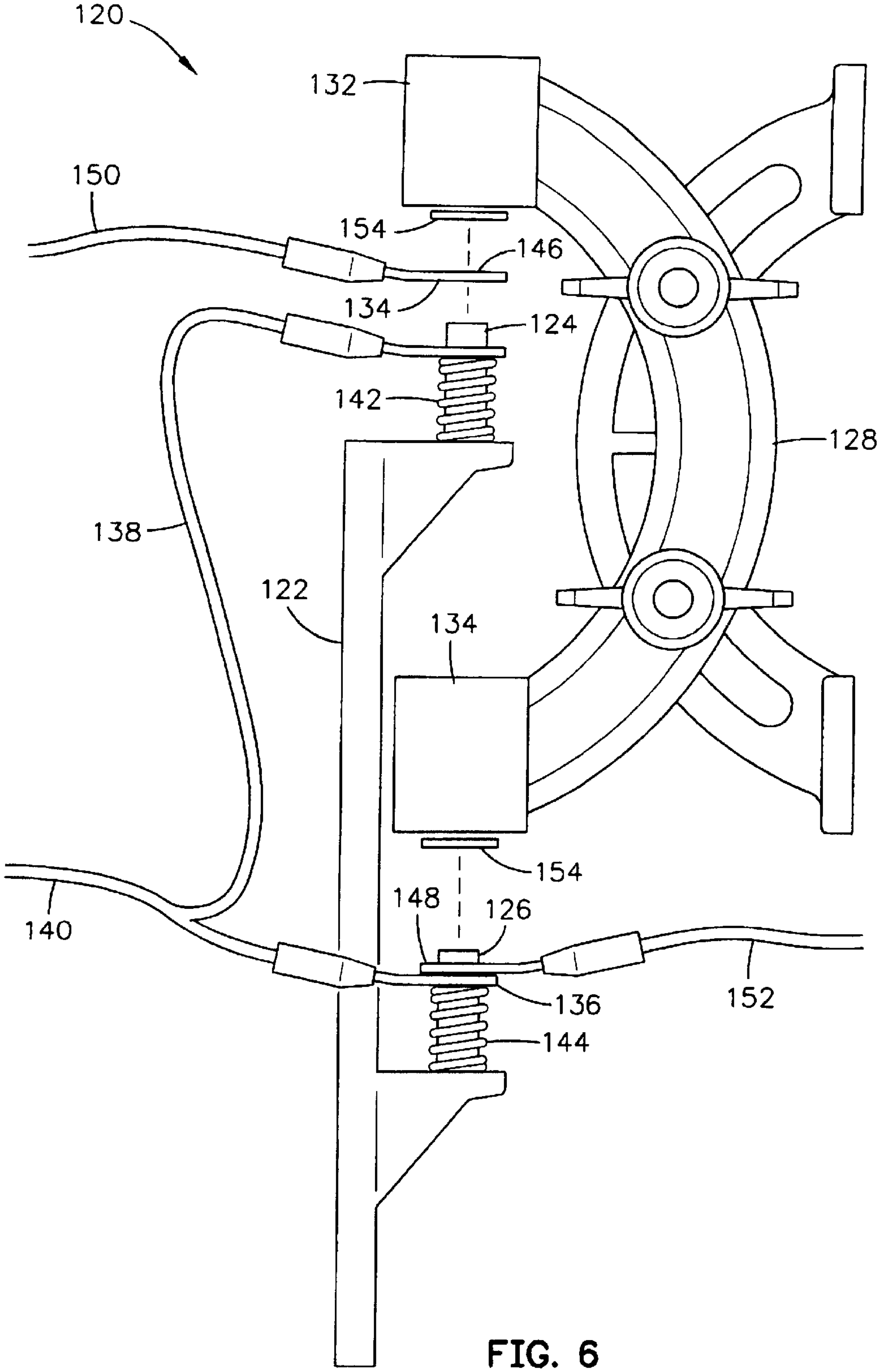
FIG. 6 is a view like 5—5 of FIG. 4 a further embodiment.

Referring to FIGS. 4 and 5 of the drawing, an alternate embodiment of a speaker mounting system, in accordance with the invention is illustrated and designated generally by the numeral 70. This embodiment provides a bracket that enables adjusting the direction of the speaker about both horizontal and vertical axes. The mounting system comprises a first bracket member 72 that is adapted for mounting to a support structure such as a wall or the like. The first bracket member comprises a generally rectangular first mounting plate 74 preferably formed of, or at least covered by an insulating or non-conductive material. The bracket member has a back face adapted to engage a wall or other surface and be suitably attached thereto. The bracket member may be secured or attached by suitable means such as screws or nails through a plurality of holes 76. A pair of vertically spaced and vertically oriented pivot pin members 78 and 80 are mounted on a front face of the bracket member. These pin members include conductive contacts 82 and 84 that are adapted to be connected by speaker wires or conductors 86 and 88 to an audio amplifier or the like. The contacts may be conductive pins or screws that extend the length of the pivot pin members and the speaker wires or leads may be connected thereto by screws, nuts, solder or other means 90 and 92. The conductors are adapted to be connected to an amplifier or other source of sound for the speaker.

A second component of the speaker mounting system in accordance with this embodiment of the invention is illustrated and designated generally by the numeral 94. This second bracket member combines with the first bracket member 74 to form the overall bracket system. The second bracket member comprises a generally elongated curved bar member 96 having sockets 98 and 100 at each end thereof. This second bracket member is also preferably formed of, or at least covered by an insulating or non-conductive material. The sockets include conductive contacts 102 and 104 therein adapted to be connected to the speaker and engage contacts 82 and 84 on the pivot pin members when the bracket member is assembled with bracket member 72. These conductive contacts may be pins or screws and are adapted to be connected by speaker wires or conductors 106 and 108 which may be connected by nuts, solder or other means 110 and 112 to the conductor contacts. The conductor leads are adapted to be connecter to a speaker to connect an amplifier or other source of sound to the speaker.

Bracket member 94 has an attachment member 114 in the form of a curved bar member with a face plate 116 adapted to engage a wall or surface of a speaker enclosure and be suitably attached thereto. Attachment member 114 may be secured or attached by suitable means such as screws or nails through a plurality of holes 118. Bracket member 114 is attached to member 96 by means such as a bolt with wing nut 120 through a slot in one member and a hole in the other member. This enables adjustment of the speaker about a horizontal axis.

Referring to Fig. of the drawing, a further embodiment of a speaker mounting system, in accordance with the invention is illustrated and designated generally by the numeral 120. This embodiment utilizes the same basic bracket as that of FIGS. 4 and 5 and provides a simple kit that enables application of electrical contacts to the bracket without any modification of the bracket. The mounting system comprises a first bracket member 122 that is adapted for mounting to a support structure such as a wall or the like. The first bracket member comprises a generally rectangular first mounting bar or plate having pair of vertically spaced and vertically oriented pivot pin members 124 and 126 are mounted on a front face of the bracket member.

The second component of bracket member comprises a generally elongated curved bar member 128 having sockets 130 and 132 at each end thereof which receive and mount on pins 124 and 126. The bracket members are provided with conductive contacts 134 and 136 in the form of conductive loop lead terminals adapted to be connected by conductor leads or wires 138 and 140 to an amplifier (not shown). The loops are simply placed on the pins as shown without any modification of the bracket. A pair of springs 142 and 144 are preferably provided and placed below the lower contact members to insure engagement between the contacts. The springs bias the contacts 134 and 136 upward into engagement with a second set of contacts 146 and 148.

A second set of contacts 146 and 148 are connected by leads 150 and 152 to the speaker and engage contacts 134 and 136 on the pivot pin members when the bracket member 122 is assembled with bracket member 128. These conductive contacts may be to the area around the sockets by any suitable bonding means such as glue, epoxy, tape or other means. One suitable means is a washer 150 made from a double sided adhesive tape.

The present invention is presented as modifications to existing or off the shelf brackets. It will be apparent that other forms of brackets may be designed and incorporate contacts in accordance with the principles of the invention.

While the present invention has been illustrated and described by means of specific embodiments, it is to be understood that numerous changes and modifications can be made therein without departing from the spirit and scope of the invention as defined in the claims.

I claim:

1. A speaker mounting system, comprising:

a first bracket member comprising a first non-conductive mounting plate having a back face adapted to engage and attach to a wall surface, and a front face having at least one first forwardly and upwardly extending lip along a lower pardon thereof;

a first pair of laterally spaced conductor contacts disposed at least ax the juncture of said front face and said upwardly extending lip on said first bracket member for connection to a pair of speaker conductors;

a second bracket member comprising a second mounting plate having a back face adapted to engage and attach to an outer surface of a speaker, and a front face having at least one second forwardly and downwardly extending lip along an upper portion thereof adapted to hook over and engage said first lip of said first bracket member for detachably attaching to said first bracket member; and a second pair of laterally spaced conductor contacts disposed at least at the juncture of said front face of said second mounting plate and said downwardly extending lip on said second member for engagement with said first pair of conductor contacts on said first bracket member when said upwardly extending lip is engaged by said downwardly extending lip and for connection to a pair of speaker conductors on said speaker.

2. A speaker mounting system according to claim 1 wherein said first bracket member and second bracket member have at least two points of engagement therebetween, and said points of engagement include said conductor contacts.

3. A speaker mounting system according to claim 2 wherein said points of engagement comprise laterally spaced mounting points of said second bracket member to said first bracket member.

4. A speaker mounting system according to claim 2 wherein said points of engagement comprise at least one projection on an outer edge of said first and second lips and a receptacle at the juncture of one of said front face and one of said lips.

5. A speaker mounting system according to claim 1 wherein said forwardly and upwardly extending lip is formed of a conductive material and defines at least one of said first conductor contacts; and said forwardly and downwardly extending lip is formed of a conductive material and defines at least one of said second conductor contacts.

6. A combination electrical connector and speaker support, comprising:

a first bracket member comprising a first non-conductive mounting plate having a substantially planar back face adapted to engage and attach to a wall surface and a front face having a first pair of laterally spaced first conductor members, each first conductor member having a first forwardly and upwardly extending lip along a lower portion of said first mounting plate to define a juncture thereof for connection to a pair of speaker conductors; and a second bracket member comprising a second non-conductive mounting plate having a back face adapted to engage and attach to an outer surface of a speaker enclosure and a front face having a second pair of laterally spaced second conductor members, each second conductor member having a second forwardly and downwardly extending lip along an upper portion of said second mounting plate to define a juncture thereof adapted to hook over and engage said first lip of said first conductor members for electrically connecting and detachably supporting a speaker to said first bracket member.

7. A speaker mounting system according to claim 6 wherein engagement between a first conductor member and a second conductor member includes at least one projection on an outer edge of each of said first and second lip and a receptacle on the juncture associated with each of the other of said first and second lip.

8. A combination electrical connector and speaker support, comprising:

a first bracket member comprising a first non-conductive mounting plate having a substantially planar back face adapted to engage and attach to a wall surface and a front face;

a first pair of laterally spaced first conductor members attached to said front face, each first conductor member having a forwardly and upwardly extending first lip along a lower portion of said first mounting plate to define a juncture thereof or connection to a pair of speaker conductors, each first conductor member having at least one projection on an outer edge of each of said first lip, and a receptacle on the juncture associated with the other of each of said first lip; and a second bracket member comprising a second non-conductive mounting plate having a back face adapted to engage and attach to an outer surface of a speaker enclosure and a front face;

a second pair of laterally spaced second conductor members, each second conductor member having a forwardly and downwardly extending second lip along an upper portion of said second mounting plate to define a juncture thereof adapted to engage a first lip of a first conductor member for electrically connecting and detachably supporting a speaker to said first bracket member a receptacle on the juncture associated with the other of said second lip.

* * * * *